United States Patent
Gan et al.

(10) Patent No.: US 6,282,461 B1
(45) Date of Patent: Aug. 28, 2001

(54) INDEPENDENT TUBE POSITION VERIFICATION SYSTEM

(75) Inventors: Zhongxue Gan, Storrs, CT (US); Lance T. Fitzgibbons, Southwick, MA (US); Jeffrey S. Katz, West Hartford, CT (US)

(73) Assignee: Westinghouse Electric Company LLC, Monroeville, PA (US)

( * ) Notice: Subject to any disclaimer, the term of this patent is extended or adjusted under 35 U.S.C. 154(b) by 0 days.

(21) Appl. No.: 09/349,981

(22) Filed: Jul. 9, 1999

Related U.S. Application Data

(60) Provisional application No. 60/092,927, filed on Jul. 15, 1998.

(51) Int. Cl.[7] .............................. G05B 15/00; G06K 9/00; G06K 9/46; G06K 9/36
(52) U.S. Cl. .......................... 700/258; 382/106; 382/190; 382/291
(58) Field of Search ................... 700/245, 247, 700/255, 259; 345/433, 438; 382/103, 106, 153, 154, 170, 181, 190, 203, 291

(56) References Cited

U.S. PATENT DOCUMENTS

| | | | |
|---|---|---|---|
| 4,873,651 | 10/1989 | Raviv . | |
| 5,579,444 | * 11/1996 | Dalziel et al. | 700/259 |
| 5,602,967 | 2/1997 | Pryor . | |
| 5,751,610 | 5/1998 | Gan et al. | 364/571.03 |
| 5,838,882 | 11/1998 | Gan et al. | 395/94 |
| 5,878,151 | 3/1999 | Tang et al. | 382/103 |
| 5,887,041 | * 3/1999 | Zachar et al. | 376/248 |
| 5,943,164 | * 8/1999 | Rao | 359/462 |
| 5,963,303 | * 10/1999 | Allen | 352/86 |
| 5,974,348 | * 10/1999 | Rocks | 701/28 |

OTHER PUBLICATIONS

International Preliminary Examination Report (IPER) from International Preliminary Examination Authority, dated Apr. 4, 2000.

* cited by examiner

Primary Examiner—William A. Cuchlinski, Jr.
Assistant Examiner—Thu Nguyen
(74) Attorney, Agent, or Firm—Robert P. Kananen; Rader, Fishman & Grauer

(57) ABSTRACT

An independent tube position verification system includes a TV camera (16) mounted on an end effector (EE) of a robotic arm (20) mounted in a steam generator (10) beneath the tube sheet (12) to visually track changes in position as the end effector (EE) is moved across the tube sheet (12) by a robotic arm (20). The tube sheet (12) and the tube ends (14) thereof are illuminated by one or more light sources (18) at an oblique angle to cause the desirable presence of shadows in the field of view. The TV camera (16) outputs successive image frames so that displacement of a artifact in the image field in successive frames yields physical displacement information which is converted into velocity and direction information. Changes in position determined by the verification system are compared against position information maintained by the robotic arm (20); any mis-match indicates a loss of tracking integrity requiring a system re-calibration.

18 Claims, 6 Drawing Sheets

INDEPENDENT TUBE POSITION VERIFICATION SYSTEM

This application claims benefit to US provisional application 60/092,927 filed Jul. 15, 1998.

BACKGROUND ART

The present invention relates to the optical determination of the physical position of tube ends in a steam generator of the type typically used in nuclear power stations.

The steam generators used in nuclear power stations typically have a tube sheet into which the ends of thousands of heat exchanger tubes are secured in a fluid tight relationship. Heated primary fluid from the nuclear reactor is passed through the tubes to exchange heat with the secondary working fluid which, in turn, drives the turbomachinery used to generate electricity. Since the primary fluid can be radioactive, the tube sheet is subject to inspection during those times that the power station is off-line for repairs and maintenance. Historically, the inspection of the tube sheet and the tube ends involved the use of technicians who would enter the steam generator and effect a visual inspection of the tube ends and conduct manual tests using various types of inspection devices to detect cracked, leaking, or otherwise damaged tubes. The defective tubes were typically "plugged" to seal the end of the tube to remove the affected tube from service and prevent leakage.

More recently, computer controlled robotic arms with specialized end-effectors have been used to effect the visual inspection of the tube ends and to effect the repairs. Contemporary robotic arms include several articulated joints with different length links between the various joints. Each joint includes, for example, a command-driven stepping motor or a rotary actuator and a cooperating angle position sensor (such as an optical encoder) that cooperate with a controller to control the angular movement of the links connected to the joint. The robotic arm is secured in place within the steam generator and beneath the tube sheet during the system shut-down. An end effector assembly is mounted to the end of the robotic arm and typically carries a television camera, one or more illumination sources, inspection tools (such as an eddy current device to detect cracked tubes), and/or tooling to effect plugging of a tube end. In general, the end effector is positioned in and moves in a plane spaced a selected distance (i.e., 2–5 cm or more) from the surface of the tube sheet.

The computer that controls the robotic arm is under the control of an operator who can move the end effector across the tube sheet using a simple joystick or by specifying a target x,y destination tube. Once the robotic arm is positionally calibrated or initialized at a known start position and knowing the tube diameter and the center-to-center pitch distance, the computer can calculate the best path from the start or initial position to the target x,y position and, in most cases, re-position the end-effector over the desired target tube. However, it is not uncommon for the robot arm to be subject to bending forces, especially when the arm is positioned at its maximum extent from its supports. Thus, an unintended deflection of one degree or so at an extension of two meters or so can cause the end effector to be positioned over a tube that is different from the target tube.

The mis-positioning of the end effector over a tube other than the intended target tube poses substantial safety implications. More specifically, the end effector can be unintentionally positioned over a known good tube and be commanded to plug that known good tube while inadvertently leaving an adjacent defective "target" tube in-service when the steam generator re-enters service.

Governmental agencies that regulate the nuclear industry require that the tube position be independently verified to maximize the probability that an end effector will be positioned over an intended target tube end. In general, tube ends can be independently counted by the system operator who counts tube ends as they move across a video monitor that displays the output of the TV camera mounted on the end effector. However, operator fatigue and inattention can cause a mis-count and the 'loss' of the independent count.

Representative prior art disclosures of robotic arm end-effectors used in the servicing of steam generators in nuclear power plants include U.S. Pat. Nos. 5,751,610, 5,838,882, and 5,878,151, the disclosures of which are incorporated herein by reference.

DISCLOSURE OF THE INVENTION

The present invention provides an independent tube position verification system by which successive frames of the video output of a camera or other imaging device on the end effector are processed to recognize the passage of tube ends across the visual field of the camera and identify the velocity, acceleration, and direction of the tube ends as the images thereof move across the image frame. A prediction is made as which of several possible destinations are available. When one of the several possible destinations is achieved, an independent x,y counter is appropriately incremented or decremented to track the tube position independently of the robotic arm.

When the computer controlling the robotic arm indicates the end effector has arrived at the commanded target tube end, the position coordinates of the independent counter are compared with that of the commanded position. If the positions match, the independent verification requirement is met; conversely, if the comparison does not match, an indication that the robotic arm has lost track is provided and the robotic arm is subject to a re-calibration or re-initialization step prior to re-attempting to,acquire the target tube.

The imaging device typically takes the form a television camera that is preferentially mounted on the end effector at an oblique angle relative to the tube sheet (i.e., 45–55 degrees) with the illumination source similarly mounted so that the camera perceives a perspective field of view with the illumination source creating a shadow effect that can be discerned by the image processing software. In general, it is desirable that about 40% of the image of each tube end and its shadow be a shadow cast by the tube end or cast by a part of the tube end.

As the end effector is moved over the tube sheet at speeds of up to 30 cm/sec, the imaging device takes successive image frames at a known frame rate (i.e., 32 frames/sec or 0.03135 seconds between frames). A comparison between successive frames of discernable artifacts within each frame yields a knowledge of the speed and direction of transit of the end effector across the tube sheet and yields information allowing the system to increment and/or decrement x,y counters that count relative to an initial position and thus keep track of the movement of the end effector independently of the command driven robotic arm.

The mounting of the camera at an oblique angle relative to the tube sheet causes the camera to perceive a field of view in which the tube ends appear in a perspective frame with near field tube ends appearing larger than far field tube ends and with the tube ends appearing to converge toward a distant vanishing point. Measurement of the apparent angle of convergence between successive image frame yields information as to the spacing between the end effector and the plane of the tube sheet and variations thereof. The angle of convergence information is used to control the z-axis of the robotic arm to closely and optimally control the spacing between of the end effector and the plane of the tube sheet to maximize the position tracking functionality of the system.

BRIEF DESCRIPTION OF THE DRAWINGS

The present invention is described below, by way of example, with reference to the accompanying drawings, wherein.

BEST MODE FOR CARRYING OUT THE INVENTION

Figure 1:
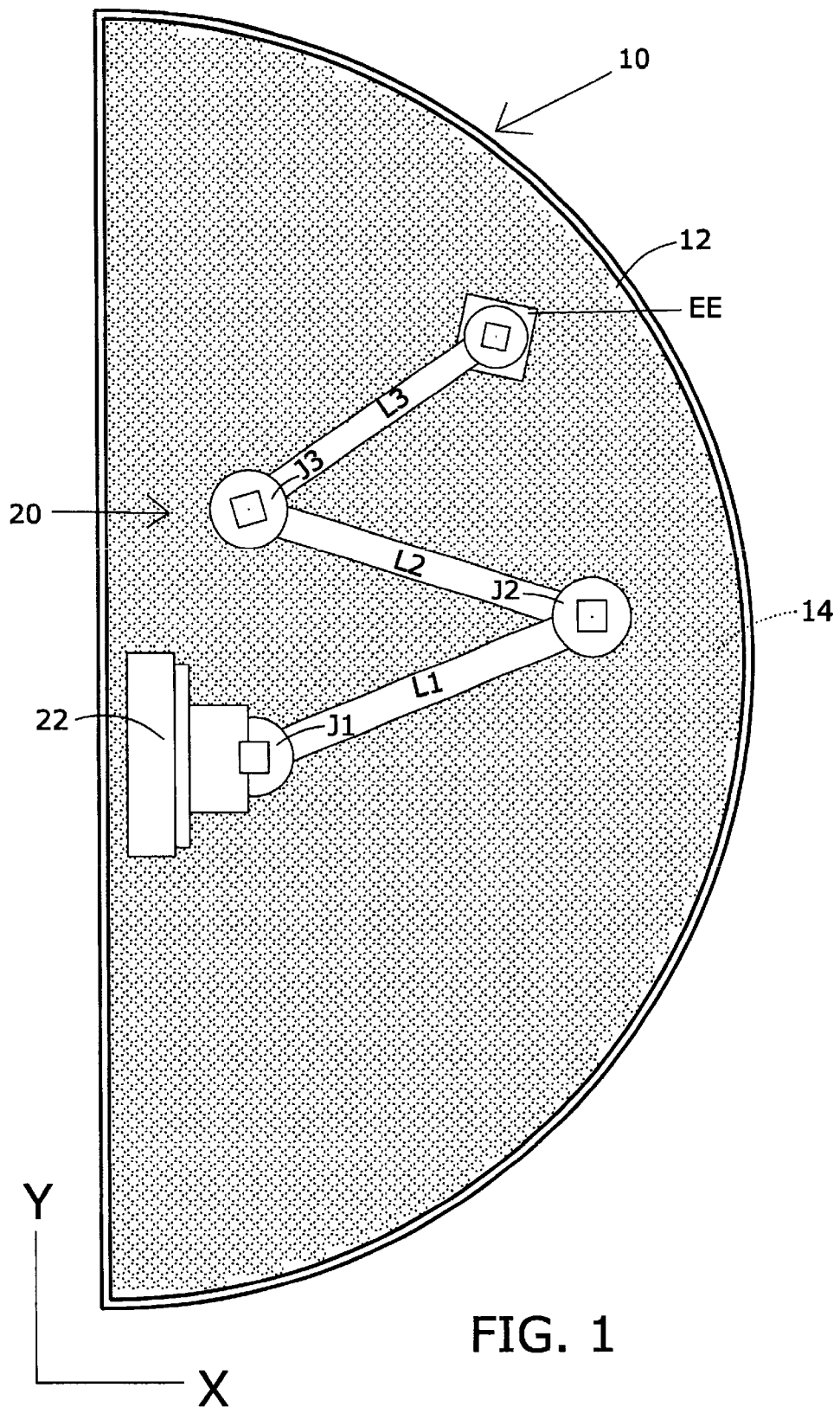
FIG. 1 illustrates a bottom view of a representative tube sheet in which a robotic arm has been mounted, the robotic arm capable of moving in an x,y plane and along a z axis normal to the x,y plane.

An independent tube position verification system in accordance with the present invention is designed to operate in an installed position beneath the tube sheet of a steam generator 10 of the type typically used in nuclear or conventional fossil fuel plants. FIG. 1 illustrates a partial and schematic view of a representative tube sheet 12 presenting a multitude (i.e., many thousands) of tube ends 14 (dotted-line illustration). While tube sheet configurations vary from manufacturer to manufacturer, most tube sheets are horizontally aligned with the tube ends arrayed in a repeating matrix pattern with individual tubes separated by a selected pitch distance. The position of each tube end is known and can be characterized by some coordinate designation, i.e., by x,y coordinates, in accordance with the exemplary embodiment.

As is known in this industry, the portions of the tubes that are fitted into and through the tube sheet are liable to cracking and, in some case, fracture. The typical repair involves "plugging" the end of the tube with a plug member (not shown) that closes the tube off to fluid flow when the steam generator 10 is returned to service.

In the context of the present invention, a robotic arm, shown in generic form and indicated generally at 20, is located beneath the tube sheet 12. The robotic arm 20 includes a base 22 that is secured to a structural member (not shown) and a plurality of articulated links, L1, L2, and L3 in the case of the disclosed embodiment. The link L1 is connected to the base by a joint J1 and connected to the second link L2 by another joint J2. In a similar manner, the line L2 is connected to the third link L3 by a joint J3. Each joint includes a rotary actuator that can be commanded by a controller (not shown) to control the angular position of the joint. Depending the manufacturer of the robotic arm, the rotary actuator can take the form of a command-driven stepping motor or a traditional control loop by which an angular position indicator, such as a optical shaft encoder, provides angular position information to the controller which, in turn, drives a rotary actuator to a desired position. Accordingly, the robotic arm 20 can be controlled to access most, if not all, the tube ends 14 for inspection, service, or repair.

Figure 2:
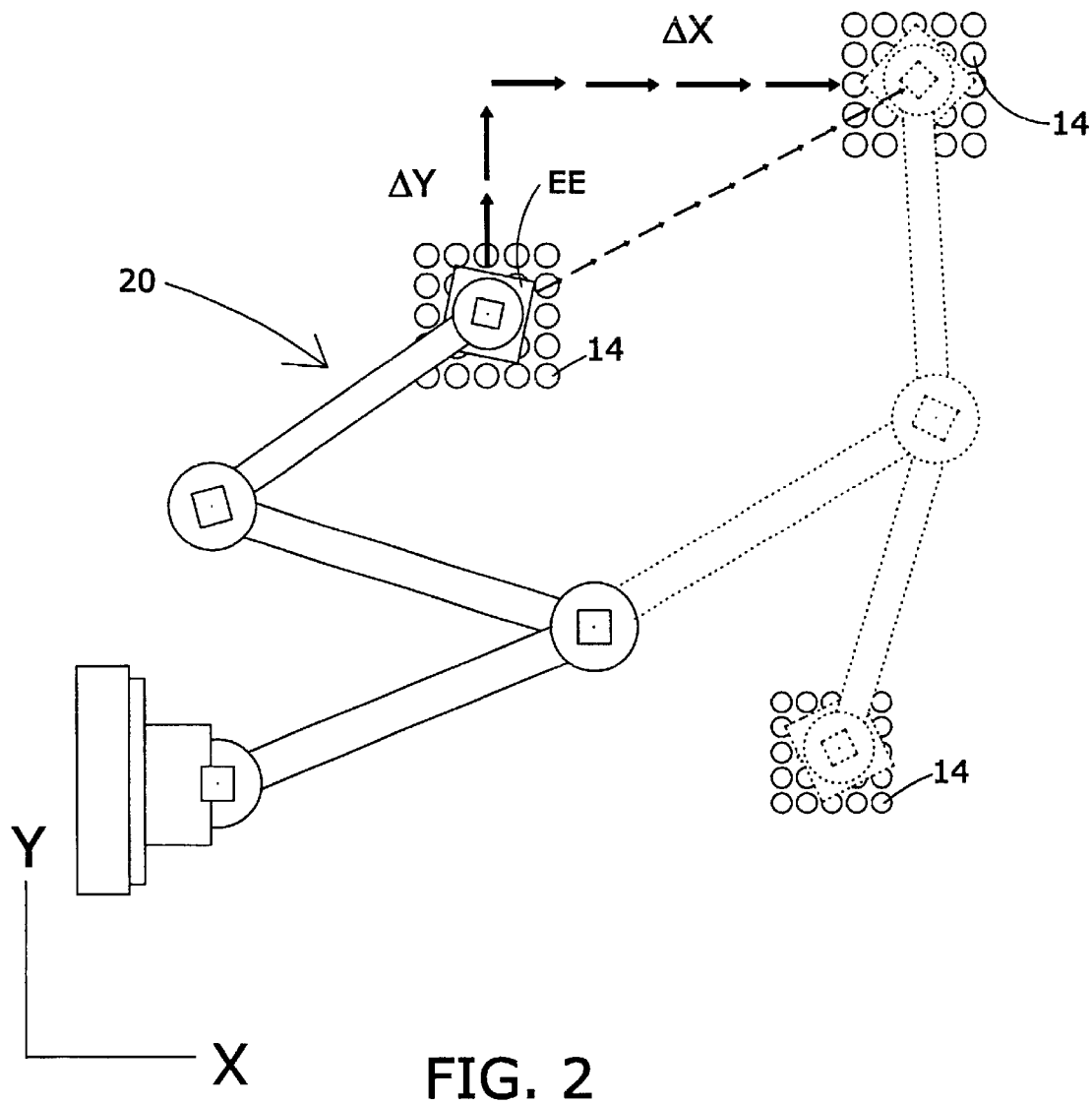
FIG. 2 is a view of the robotic arm of FIG. 1 showing the arm in a first position (solid-line illustration) and in two other positions (dotted-line illustration)

While not specifically shown in FIGS. 1 and 2, the robotic arm 20 includes a degree of freedom in the z-axis toward and away from the plane that defines the surface of the tube sheet 12. Depending upon the manufacturer of the robotic arm, z-axis movement toward and away from the tube sheet 12 can be accomplished by fluid cylinder (hydraulic or pneumatic) or an electrical actuator (i.e., a motor driven screwjack or a linear actuator).

An end effector EE is mounted to the. distal end of the link L3 and typically includes tooling designed to effect the desired inspection, service, or repair of the tube ends 14. As explained in the above-incorporated U.S. Pat. No. 5,878, 151, the end effector EE can include an eddy current inspection device, a guide pin, tube-end alignment lamps, various types of tooling, and a television camera that outputs a video signal to a remotely located system operator. Typically, the end effector EE and/or the tooling carried thereon can be commanded to move toward and away from the tube end along the z-axis.

As shown in FIG. 2, the robotic arm 20 can be moved from an initial or starting position (solid-line) to subsequent positions (dotted-line) in the x,y plane to reposition the end effector EE over a particular tube end 14. The robotic arm 20 can be moved by appropriate commands from an operator-controlled joystick or by entering target x,y coordinates into a controller (not shown) that causes the robotic arm 20 to move to the target tube end 14. The controller typically calculates the shortest or most direct path from the present position to the target position. In some cases, the shortest or most direct path may not be available to the robotic arm 20 because of intervening structural supports, etc. in the space below the tube sheet 12. In these cases, the controller is programmed with forbidden paths to prevent unintended accidents. In the case of FIG. 2, for example, the end effector EE can be moved from its initial solid-line position to the first-dotted line position by first moving the end effector EE a selected distance upwardly along the Y axis and then moving the end effector EE to the right along the X axis to the first-dotted line position. Conversely, end effector EE can be moved from its initial-solid-line position to the first-dotted line position by first moving the end effector EE a selected distance to the right along the x axis and then moving the end effector EE to upwardly along the y axis to the first-dotted line position. Alternatively, the end effector EE can be moved along a shortest-path straight line. In the preferred embodiment, the robotic arm 20 can move the end effector EE (and its TV camera) at a speed of about 30 cm/sec. In general, it is preferred that the start and stop acceleration-profile be logarithmic, i.e., a very slow start with progressive acceleration to the maximum speed. A logarithmic acceleration and deceleration profile maximizes the probability that the image processing device (as explained below) will not loose capture.

Figure 3:
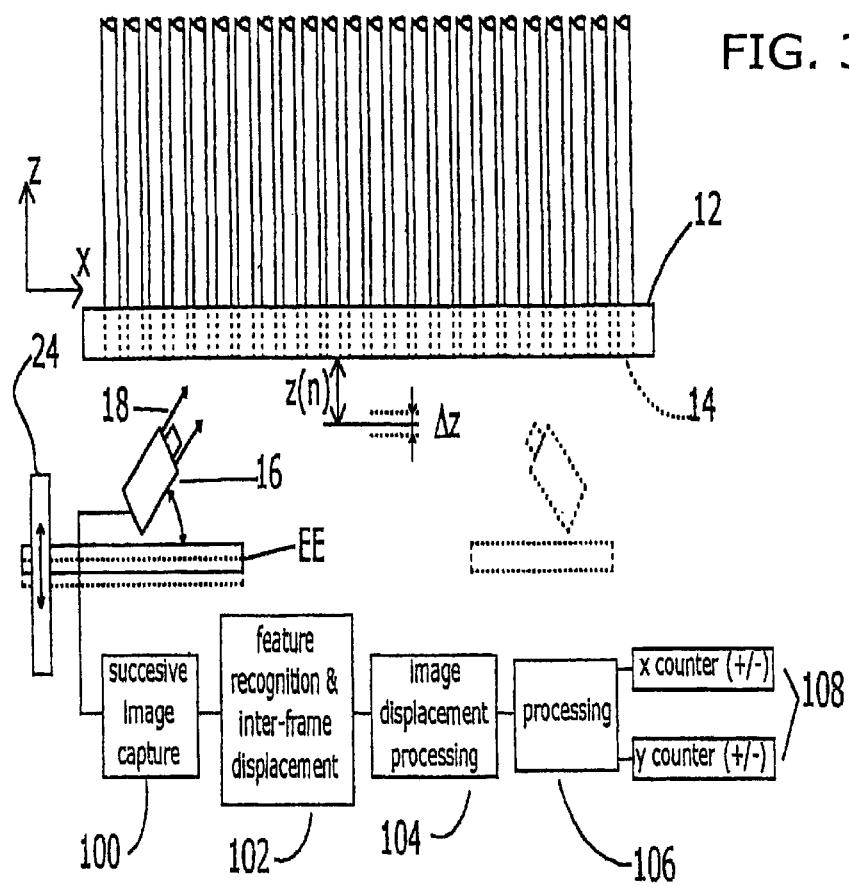
FIG. 3 is a side view of the tube sheet of FIG. 1 showing tube ends in the tube sheet and the location of a camera positioned below the tube sheet and looking up at the tube sheet at a selected angle and at an optimal spacing distance from the bottom of the tube sheet.

FIG. 3 presents a side elevational view of the tube sheet 12 of FIG.1; as shown, the tube sheet 12 of the type in which the tube ends 12 are fabricated flush with the surface of the tube sheets. The end effector EE includes a TV camera 16 that is aligned at some angle, preferably about 45–55 degrees, relative to the plane of the tube sheet 12. As represented by the parallel arrows, a light source 18 (or sources) is provided on or adjacent the TV camera 16 to illuminate the field of view. Since the TV camera 16 is fixed to the end effector EE, the viewing point of the TV camera 16 can be rotated, depending upon the movement of the robotic arm 20 and can, as shown in dotted-line illustration on the right-side of FIG. 3, take different rotary viewing aspects.

As shown in schematic form in FIG. 3 and as explained above, a z-axis actuator 24 is coupled to the robot arm 20 and is controlled to move the end effector EE toward or away from the plane of the tube sheet 12. In general, the end effector EE is optimally moved in a plane spaced a distance z(n) from the surface of the tube sheet 12. The optimum spacing distance depends upon the tooling and devices associated with the end effector EE; however, a distance of 2–5 cm is typical. As explained below, variations in the spacing distance (i.e., $\Delta z$) are addressed by commanding the z-axis actuator 24 to move the end effector EE toward or away from the surface of the tube sheet 12 and thereby maintain the optimal spacing z(n) distance.

The alignment of the light source(s) 18 at an oblique angle causes the desirable presence of shadows in the field of view. In general and as explained below, it is preferred that each tube end 14 within the field of view of the camera 16 have an associated shadow that is at least 40% of the image of the tube end and the shadow cast thereby. Since a tube sheet 12 that has been in service will often have whitish or light colored surface deposits and/or whitish reflective boron precipitates on its surface, the presence of shadows in the field of view of the TV camera 16 provides high-contrast features and edges that assist in calculating distances traversed or displaced between successive image frames, speed, and direction of travel. As explained below, this information is used to provide a running x,y position count as the end effector EE is moved beneath the tube sheet 12.

As shown in FIG. 3, the TV camera 16 outputs a video feed to an image capture unit 100 that, in the preferred embodiment, captures 32 image frames per second. When the end effector EE is in motion, features in a first frame will be displaced in the next successive frame. By knowing the feature displacement distance between successive frames and the frame-to-frame timing interval (i.e., 0.03125 seconds), a frame-to-frame distance traversed value and associated transit speed and direction can be determined. In the case of the embodiment shown in FIG. 3, a feature recognition and interframe displacement is determined at unit 102, and image displacement is calculated in unit 104 with any additional processing taking place in unit 106. The output thereof is provided to x,y counters, generally indicated at 108, that increment or decrement to provide a running count of the x,y coordinate values and the position of the end effector EE. As can be appreciated, the output of the x,y counters 108 is independent of any values used by the robotic arm controller.

While the processing in FIG. 3 is shown as taking place within separate functional blocks or units, it can be appreciated that the processing can be accomplished by firmware- or software-controlled hardware units, programmed microprocessors or computers, application-specific. integrated circuits, or combinations thereof.

Commercial image capture and processing systems are known; in the case of the preferred embodiment, the system provided by Cognex Corporation, One Vision Drive, Natick MA 01760 USA is utilized and preferred. This system includes a personal computer compatible add-in board (i.e., ISA or PCI compatible) and associated firmware and software that can be "trained" to recognize features or artifacts within the captured image frame and programmed to evaluate the movement of features or artifacts within the field of view of successive image frames. Thus, the Cognex board can be programmed to provide the functions shown in FIG. 3 and the image processing described below in relationship to FIGS. 7 and 8.

Figure 4:
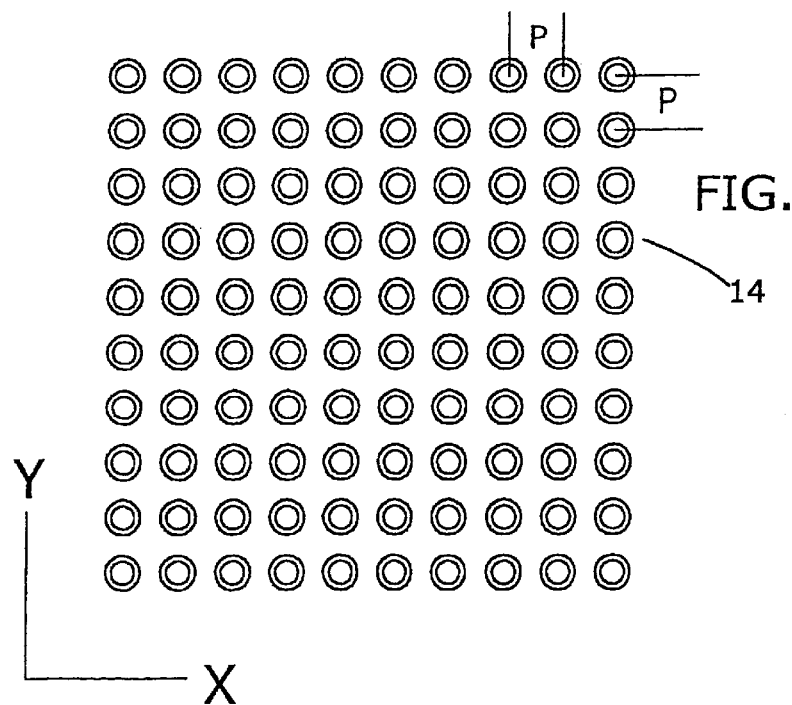
FIG. 4 is a view of a selected sub-set of the tube ends of FIG. 1 illustrating the intertube pitch distance.
Figure 5:
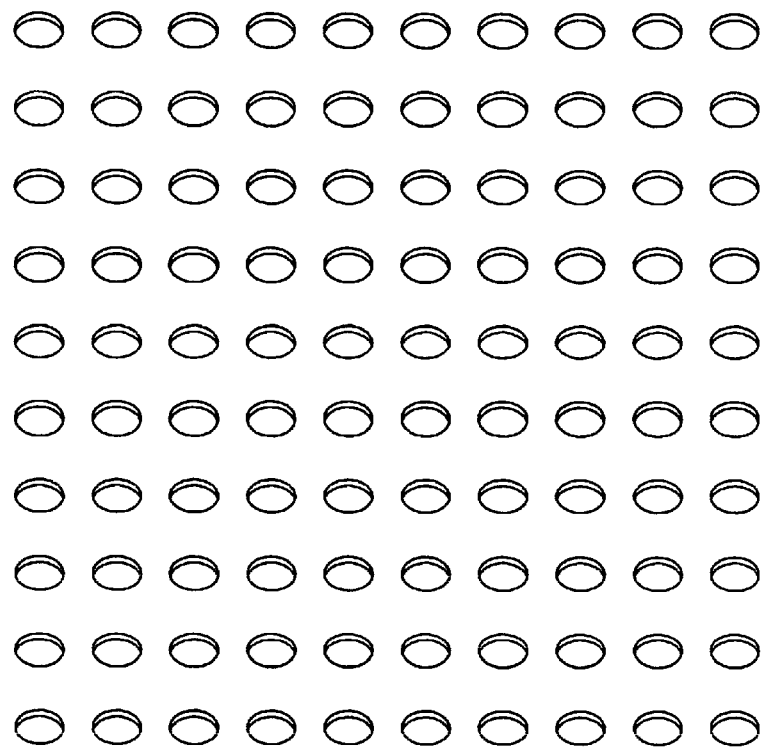
FIG. 5 is a view of the tube ends at a selected view angle.

As shown in FIG. 4, the tube ends 14 in the illustrated embodiment are presented in a rectangular x,y array having a tube-center to tube-center pitch dimension P. While tube diameters and pitch P distance vary from manufacturer to manufacturer; a typical tube end can have a diameter of about 13–15 mm. and a center to center pitch P of about 3.5 to 4.0 cm with 3.8 cm being representative. When viewed at an angle of about 45–55 degrees relative to the local horizontal, the tube ends 14 appear to have an elliptical shape as illustrated in the flat-field isometric view of FIG. 5. However, when a sub-set of the tube ends 14 (i.e., a three-by-three field) is viewed through the TV camera 16, the tube ends appear as ellipsoids that converge from the near field to the far field at an angle of apparent convergence $\alpha$ toward a distant vanishing point to provide a classic perspective view as represented in schematic fashion in FIG. 6.

While the field of view presented by the tube sheet 12 is highly uniform, certain non-uniformities exist. More specifically, the surface of the tube sheet 12 exposed to the TV camera 16 can vary in accordance with the specific design of the-steam generator 10 and its operating conditions and repair history. For example, manufacturers of some tube sheets 12 fabricate the tube ends 14 flush with the surface of the tube sheet 12 while other manufacturers position the tube end 14 a selected distance beyond the surface of the tube sheet 12 so that the tube ends 14 appear to extend from the surface of the tube sheet 12. In addition, it is not uncommon for boron (typically added to the primary fluid as a moderator) to precipitate on the exposed surfaces on the primary side of the-system. Additionally, other materials may deposit on the surfaces. Lastly and depending upon the service history of the steam generator 10, some tube ends 14 within the field of tube ends 14 will have been previously "plugged" or capped to remove the tube from service. The particular plugs used can include those that are flush with the tube end when installed and those that extend a selected distance from the tube end.

The use of oblique lighting (of about 45–55 degrees) allows the formation of shadows within the field of view. For example, in the case where the tube ends 14 are fabricated flush with the surface of the tube sheet 12, the near rim of each tube end 14 will cast a shadow against the far interior wall surface. In those cases where the tube ends 14 extend a short distance above the surface of the tube sheet 12 or where a plug has been inserted into a tube end, each tube end and plug will also cast a shadow having a 'half-moon' appearance. Lastly, were boron precipitates have formed accretions, such as stalactite-like formations, on the exposed surfaces, these formations likewise provide shadowing opportunities.

It is important that the light source and the lens of the TV camera 16 be so aligned relative to each other that the TV camera 16 will 'see' any shadows within the field of view cast by the light source(s). The shadows and their edges provide image features used to train the image processing system as explained below.

Figure 7:
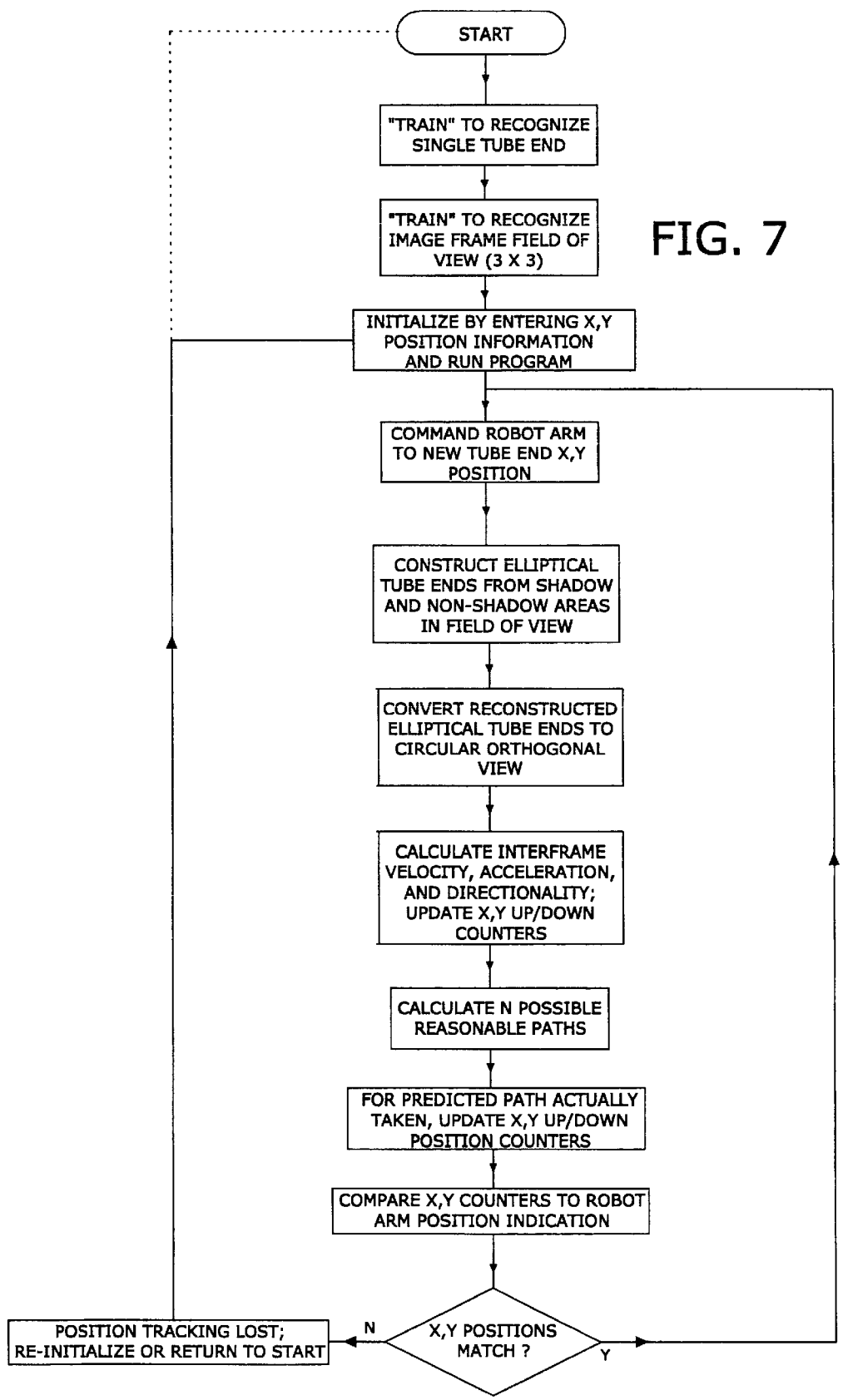
FIG. 7 is a processing flow diagram showing the manner by which the x,y position of the robot arm is verified by the image system.

FIG. 7 represents an exemplary and preferred processing sequence. Once the system is initialized during start-up and operating parameters set, the image processing software is "trained" in accordance with manufacturer-specific protocols to recognize a single tube end and a defined field of tube ends (i.e., a n×m matrix of tube ends). The software training is specific to each tube sheet to be inspected, serviced, and repaired. Thereafter and before the robot arm 20 is commanded to move to a new position, the initial position is stored in the x,y counters 108. The program runs while the robot arm 20 is moved about in the x,y plane beneath the tube sheet 12 with the software constructing virtual elliptical tube ends from the non-shadow and shadow image artifacts or features within each image frame. It is preferred that the minor and major axes of each ellipse be constructed by singular value decomposition methods so that the center of each ellipse can be determined. Once the ellipse centers are determined, the elliptical tube ends are transformed to circular orthogonal projections. After the elliptical tube ends are converted by transformation to virtual circular tube ends, the displacement of features in successive frames is used to calculate interframe velocity, acceleration, and directionality. Thus, if a feature is "seen" to be displaced by 1 cm between successive frames, distance information related to displacement can be used to update the x,y counters. Since the robot arm 20 will only occasionally move the end effector in a rectilinear manner, perceived angular rotation or angular displacement values are used to resolve displacement into x,y values. At this point, the x,y counters can be incremented or decremented (i.e., updated) with new position information. In accordance with one aspect of the present invention, the system calculates several possible likely paths based upon the known velocity, acceleration, and direction information and, for the path actually taken, updates the x,y positional counters. End effector velocity can be determined by knowledge of interframe displacement and the time duration (0.03125 seconds) between successive frames. Path prediction provides a measure of operational reliability in the event the robot arm is disturbed by an outside influence. At some point in the process flow, including points at which the end effector EE has nominally arrived at a target position, a comparison is made between the x,y positions independently tracked by the above-described image processing system and the x,y position information provided by the robot arm 20. If the positions "match," the robot-system and the image tracking system are in agreement indicating no loss of positioning or tracking integrity. Conversely, a mis-match represents an indication of a tracking loss and requires the system to be re-initialized. The system is re-initialized by returning the end effector EE to a known starting position and entering the x,y coordinates and restarting end effector movement; in practice, system re-initialization takes less than 60 seconds. As indicated by the dotted-line path in the upper left of FIG. 7, the system can also be re-initialized by returning to the training steps.

The accuracy of the x,y position tracking by the image, processing path is dependent upon the spacing distance z(n) and the x,y plane in which the end effector EE is moved. Ideally, the surface of the tube sheet 12 should lie in a flat plane and the end effector EE should be moved by the robotic arm 20 in a flat x,y plane separated from the tube sheet 12 by an optimum spacing valve z(n). In practice, it is possible for the tube sheet 12 to suffer dimensional warping after years of service and for the robot arm 20 to sag or droop when the various links are positioned at their maximum extension. In practice, the spacing distance varies by some amount $\Delta z$ from the desired nominal spacing distance z(n).

Figure 6:
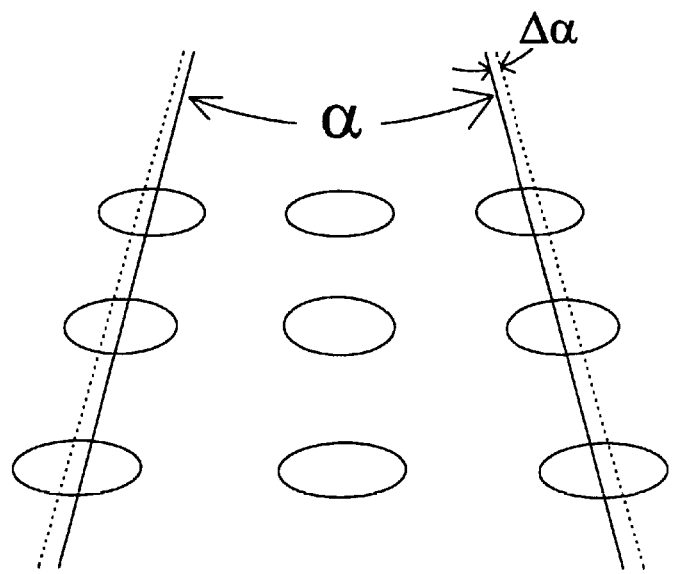
FIG. 6 is a schematic perspective view of a three by three set of tube ends with the tube ends illustrated as converging toward a distant vanishing point.

In accordance with one aspect of the present invention, the spacing distance z(n) is kept within desired tolerances by actively controlling the z-axis actuator 24 to move the end effector EE toward and away from the tube sheet 12 in response to an error signal derived from successive image frames. As shown in FIG. 6, the camera-perceived image of the 3×3 matrix of tube ends 14 presents a set of elliptical objects in which the near field objects are larger and wider apart than the far field objects and in which the objects appear to converge at an angle a toward a distant vanishing point as is consistent with perspective views. A shown by the dotted-line representations in FIG. 6, the angle of apparent convergence $\alpha$ changes as a function of the spacing distance between the local surface area of the tube sheet 12 under observation by the TV camera 16 and the end effector EE.

Figure 8:
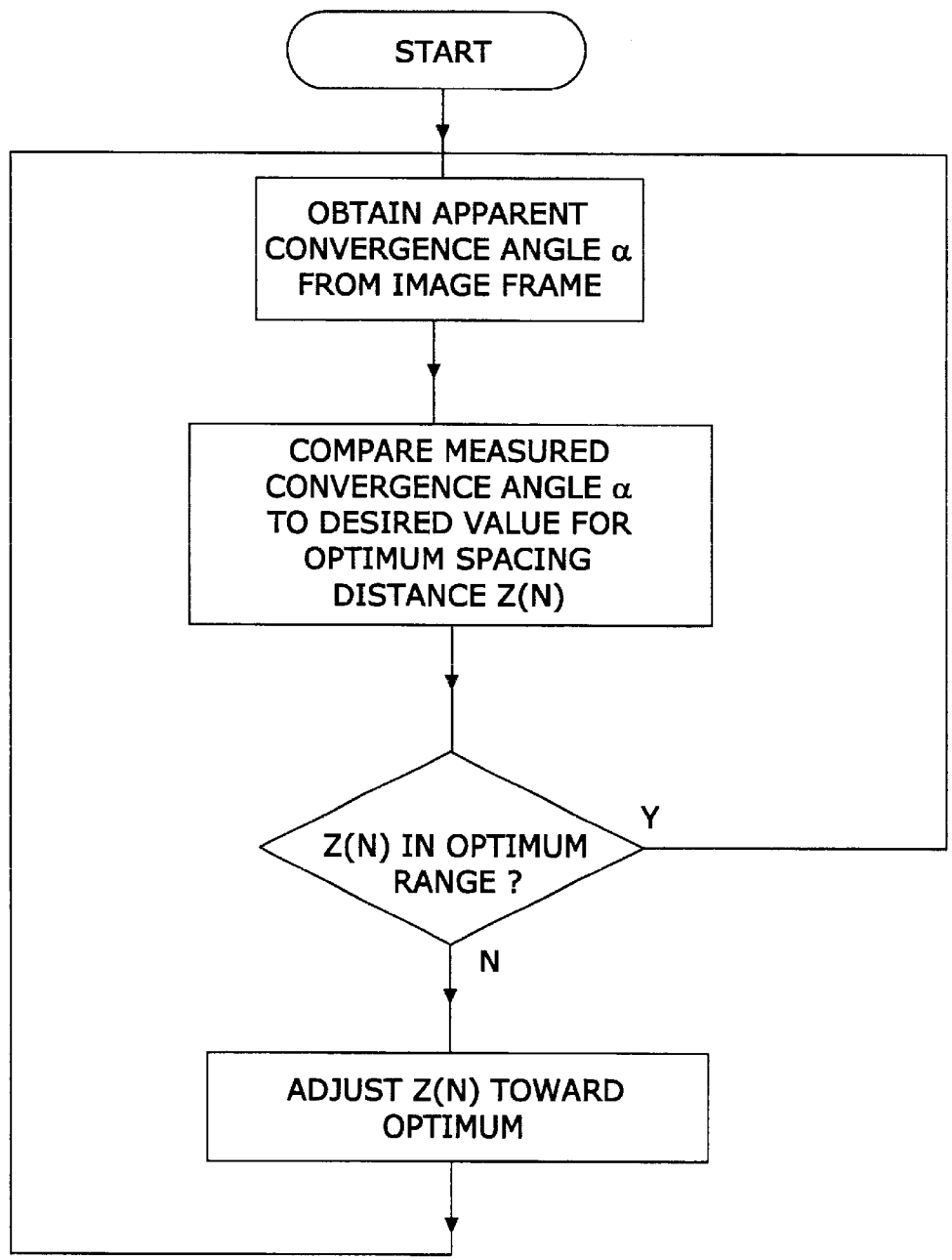
FIG. 8 is a processing flow diagram showing the manner by which the spacing distance z(n) the end effector is controlled as a function of the angle of apparent convergence in the image frame of FIG. 6.

The spacing distance is increased or decreased as a function of the apparent angle of convergence $\alpha$ perceived in each frame as shown in FIG. 8. As shown, the apparent convergence angle $\alpha$ is obtained by the image processing software (which finds the centers of the observed ellispses as mentioned above) and is compared to a value empirically determined to correspond to the optimum spacing distance z(n) (i.e., 2–5 cm). If the observed value of the angle $\alpha$ is outside the optimum range, the z-axis controller 24 is operated to drive the end effector EE toward and to the optimum spacing distance z(n) by moving the end effector EE away from or towards the tube sheet 12. The system thus functions as a classic feedback loop for each image frame taken. At all times, the end effector EE is maintained at or near the optimum spacing distance z(n) despite variations in the plane of the tube sheet 12 and variations in the ability of the robot arm 20 to hold the end effector EE in the desired x,y plane.

While the comparison between the between the angle of apparent convergence a can-be determined quantitatively, the comparison can be made qualitatively, i.e., a determination is made whether or not the observed angle of apparent convergence a in an image frame is merely larger or smaller than the desired optimum value and the z-axis actuator 24 commanded to drive the robotic arm 20 and the end effector EE toward (or away) from the tube sheet (12) in a predetermined spacing step or increment. Using this qualitative technique, the end effector EE is driven toward the optimal spacing distance z(n) with minimal concern for feedback loop-gains, possible overshoot, or loop settling.

While the control of the spacing distance z(n) has been described in the context of an actuator 24 that moves the entire robot arm 20 toward and away from the surface of the tube sheet 12, as can be appreciated, the z-axis controller can be mounted on the end effector EE and merely move the camera 16 and the light source(s) 18 and any associated tooling toward and away from the surface of the tube sheet 12 to maintain the optimal spacing distance z(n).

INDUSTRIAL APPLICABILITY

The present invention is best-suited for use in the servicing of tube sheets and tube ends in steam generators used in nuclear and non-nuclear power generation systems.

As will be apparent to those skilled in the art, various changes and modifications may be made to the illustrated independent tube position verification system of the present invention without departing from the spirit and scope of the invention as determined in the appended claims and their legal equivalent.

What is claimed is:

1. A tube position verification system for use in the inspection and service of the tube sheets of steam generators (10) of the type having a plurality of tube ends (14) in a tube sheet (12) arranged pursuant to a predetermined coordinate system and a robotic arm (20) for moving an end effector EE adjacent to the surface of the tube sheet (12) to successive tube end positions, characterized by:

an imaging device (16) connected to the robotic arm (20) for imaging successive image frames as the robotic arm (20) moves an end effector (EE) across the surface of the tube sheet (12);

a light source (18) for illuminating the tube sheet (12) so as to create shadow effects within the field of view of the imaging device (16);

an image processor (104,106) for processing successive images from the imaging device (16) to discern relative displacement of image artifacts from frame to successive frame; and position coordinate registers (108) for registering displacement changes from the image processor (104,106) to track changes in the coordinates of the end effector (EE), and further characterized by a control function to maintain the imaging device (16) a selected optimum spacing distance z(n) from the surface of the tube sheet (12) under observation, wherein the control function is characterized by observing an apparent angle of convergence between objects in an image frame, comparing the observed angle to an optimum value, and moving the end effector (EE) toward the optimum spacing distance z(n).

2. The tube position verification system of claim 1, wherein the robotic arm (20) includes position coordinate indicators separate from the position coordinate registers (108) and further characterized by a comparator for the comparison of the position coordinate values of the image processor and the robotic arm (20) to determine tracking integrity of the robotic arm (20).

3. The tube position verification system of claim 1, further characterized in that the robotic arm (20) includes an actuator (24) for moving the end effector (EE) toward the surface of the tube sheet (12) or for moving the end effector (EE) away from the surface of the tube sheet (12).

4. The tube position verification system of claim 1, further characterized in that the imaging device (16) is a television camera.

5. The tube position verification system of claim 1, further characterized in that the light source (18) is aligned at an angle of about 45–55 degrees relative to the plane of the tube sheet (12).

6. The tube position verification system of claim 1, further characterized in that the image device (16) is aligned at an angle of about 45–55 degrees relative to the plane of the tube sheet (12).

7. The tube position verification system of claim 1, further characterized in that the light source (18) creates a shadow effect in which the shadow is at least 40% of the image of each shadow producing feature and its shadow in the image field.

8. The tube position verification system of claim 1, further characterized in that the light source (18) is mounted on the image device (16).

9. A tube position verification method for use in the inspection and service of the tube sheet (12) of steam generators (10) of the type having a plurality of tube ends (14) in a tube sheet (12) arranged pursuant to a predetermined coordinate system and a robotic arm (20) for moving an end effector (EE) adjacent to the surface of the tube sheet (12) to successive specified tube end positions, characterized by:

illuminating the tube sheet (12) so as to create shadow effects thereon;

taking successive image frames of the tube sheet (12) from the robotic arm (20);

processing the successive images from the imaging device (16) to discern relative displacement of image artifacts from frame to successive frame; and updating position coordinate registers for registering displacement changes from the relative displacement of image artifacts from frame to successive frame, wherein the processing step is further characterized by a control function to maintain the imaging device (16) at a selected optimum spacing distance z(n) from the surface of the tube sheet (12) under observation, and further characterized by observing an apparent angle of convergence between objects in an image frame, comparing the observed angle to an optimum value, and moving the end effector (EE) toward the optimum spacing distance z(n).

10. The tube position verification method of claim 9, wherein said processing step is further characterized by converting any perceived elliptical artifacts within an image to circular artifacts.

11. An end effector (EE) positioning system for use in the inspection and service of the tube sheets of steam generators (10) of the type having a plurality of tube ends (14) in a tube sheet (12) arranged pursuant to a predetermined coordinate system and a robotic arm (20) for moving an end effector (EE) adjacent to the surface of the tube sheet (12) to successive specified tube end positions, characterized by:

a imaging device (16) connected to the robotic arm (20) for imaging successive image frames as the robotic arm (20) moves an end effector (EE) across the surface of the tube sheet (12), the imaging device (16) positioned to provide image frames with a perspective view of objects within the image frame, the perspective view such that objects appear to converge toward a distant vanishing point;

a light source (18) for illuminating the tube sheet (12) so as to create shadow effects within the field of view of the imaging device (16);

an image processor (104,106) for processing successive images from the imaging device (16) to discern an apparent angle of convergence of image artifacts from frame to successive frame; and an actuator for effecting movement of the end effector (EE) toward or away from the tube sheet (12) to maintain an optimal spacing distance z(n) as a function of the apparent angle of convergence.

12. The end effector (EE) positioning system of claim 11, further characterized in that the light source (18) is aligned at an angle of about 45–55 degrees relative to the plane of the tube sheet (12).

13. The end effector (EE) positioning system of claim 11, further characterized in that the image device (16) is aligned at an angle of about 45–55 degrees relative to the plane of the tube sheet (12).

14. The end effector (EE) positioning system of claim 11, further characterized in that the light source (18) creates a shadow effect in which the shadow is at least 40% of the image of each shadow producing feature and its shadow in the image field.

15. The end effector (EE) positioning system of claim 11, further characterized in that the light source (18) is mounted on the image device (16).

16. An end effector (EE) positioning method for use in the inspection and service of the tube sheet (12) of steam generators (10) of the type having a plurality of tube ends (14) in a tube sheet (12) arranged pursuant to a predetermined coordinate system and a robotic arm (20) for moving an end effector (EE) adjacent to the surface of the tube sheet (12) at an optimum spacing distance z(n) to successive specified tube end positions, characterized by:

- illuminating the tube sheet (12) so as to create shadow effects thereon;
- taking successive image frames of the tube sheet (12) from the robotic arm (20), the successive image frames taken at an angle relative to the surface of the tube sheet (12) to provide a perspective view thereof in which objects in the image frame appear to converge toward a distant vanishing point;
- processing the successive images from the imaging device (16) to discern an apparent angle of convergence of objects within the image frame; and
- maintaining the imaging device (16) a selected optimum spacing distance z(n) from the surface of the tube sheet (12) under observation as a function of the apparent angle of convergence of objects within the image frame.

17. The end effector (EE) positioning method of claim 16, wherein the control function is characterized by measuring an apparent angle of convergence $\alpha$ between objects in an image frame; comparing the measured angle $\alpha$ to an optimum value, and moving the end effector (EE) toward the optimum spacing distance z(n).

18. The end effector (EE) positioning method of claim 16, further characterized in that the robotic arm (20) includes an actuator (24) for moving the end effector (EE) toward the surface of the tube sheet (12) or for moving the end effector (EE) away from the surface of the tube sheet (12).

* * * * *